(12) United States Patent
Susnjara

(10) Patent No.: US 7,650,299 B2
(45) Date of Patent: Jan. 19, 2010

(54) METHOD OF MARKETING AND ADVERTISING COMPONENT PRODUCTS USED IN THE PRODUCTION OF COMPOSITE PRODUCTS

(75) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 1593 days.

(21) Appl. No.: 09/872,335

(22) Filed: Jun. 2, 2001

(65) Prior Publication Data
US 2002/0184076 A1 Dec. 5, 2002

(51) Int. Cl.
A01K 5/02 (2006.01)

(52) U.S. Cl. .......................... 705/29; 717/100; 717/168; 703/1; 700/1; 700/95; 409/212; 483/1

(58) Field of Classification Search .................... 705/14, 705/29; 345/778, 653; 717/100, 168; 703/1; 409/212; 483/1; 700/1, 95
See application file for complete search history.

(56) References Cited
U.S. PATENT DOCUMENTS 5,717,989 A * 2/1998 Tozzoli et al. ................. 705/37
6,131,087 A * 10/2000 Luke et al. .................... 705/26
6,778,971 B1 * 8/2004 Altschuler et al. ............ 706/55
2002/0093538 A1 * 7/2002 Carlin .......................... 345/778

OTHER PUBLICATIONS

Dialog reference file 35 # 01642537 by Robin Willems "A CAD Applications to Support the Design of Injection Moulds Using High Mould Objects" Katholieke Universiteit Leuven (Belgium), 1998, p. 722. 293 pages.*

* cited by examiner

Primary Examiner—Raquel Alvarez
(74) Attorney, Agent, or Firm—Novak Druce & Quigg LLP

(57) ABSTRACT

A method of marketing component products to producers engaged in the production of composite products utilizing such component products, and the sale of such composite products to end users, generally consisting of distributing software to such producers, functional to design the composite products and including advertisements soliciting the sale of component products; receiving electronically over the internet from the producers, orders for the purchase of selected ones of the component products; transmitting electronically over the internet to selected ones of a set of vendors, orders for the purchase of component products corresponding to the selected ones of the component products ordered by the producers with instructions to ship the ordered component products to the producers; receiving invoices from the vendors of component products shipped to the producers responsive to purchase orders received by the vendors, and remitting payment thereof to the vendors; and invoicing the producers upon confirmation of the shipment of the component products by the vendors to the producers.

4 Claims, 1 Drawing Sheet

METHOD OF MARKETING AND ADVERTISING COMPONENT PRODUCTS USED IN THE PRODUCTION OF COMPOSITE PRODUCTS

This invention relates to a method of marketing and more particularly to a method of marketing component products to producers engaged in the production of composite products utilizing such component products, and the sale of such composite products to end users. The invention further contemplates the advertising of additional products in the course of marketing such components products.

BACKGROUND OF THE INVENTION

The kitchen cabinet manufacturing industry comprises a large number of firms distributed geographically throughout the United States and most other countries. Many of these firms are small in size with limited business experience and resources in the areas of both financial and staff.

In general, cabinets are built using two fundamentally different approaches. Most of the smaller manufacturers build custom cabinets, each job being handled as a custom installation with the cabinets and layout being designed specifically for the job. Individual cabinets may or may not be the same as products built for previous installations.

In the majority of custom cabinet installations, the final design and layout is the result of interaction and negotiations between the cabinet builder and the ultimate end user. When the design and layout of the product has been finalized, the cabinet maker must create shop drawings or other documentation to provide the information needed to build the cabinets, must seek out and develop a business relationship with vendors that can supply the materials, components and supplies that will be needed, and must order the appropriate quantity of such materials, components and supplies.

The effort required to perform these tasks can be substantial, especially if materials, components and supplies are purchased from a number of different suppliers. For this reason, most custom cabinet builders restrict the products they offer to a small number of vendors or distributors. This however, also reduces the variety of materials, components and supplies that the cabinetmakers can offer to their customers, making the selling process more difficult.

The second approach to cabinet making is to build essentially standard cabinets that are used unchanged, in combination with one another and with custom filler strips to achieve a kitchen layout that meets the customer's needs. This can reduce the overall cost, since it is not necessary to perform the cabinet design function for each piece. Also, if cabinets are built in standard sizes using traditional woodworking equipment, higher productivity and thus lower costs can result. This is offset by the additional cost of building and warehousing cabinets that were built in larger batches.

Using the mass-produced, standard cabinet approach, the materials, components and supplies required are generally purchased in quantity from a small number of vendors. While this may result in lower prices, it also reduces the variety available to the cabinet customer.

There are many vendors of materials, components and supplies attempting to sell their products to cabinetmakers. Since both approaches to cabinetmaking generally restrict the number of different vendors a particular cabinetmaker uses, competition to become one of the chosen vendors is intense.

There are currently a number of companies that develop and sell various types of software products to cabinetmakers. Such software generally comprises graphic design systems with varying degrees of facility, the price of such software generally reflecting its capability. In addition, most of these software products are sold in modules, allowing additional capabilities to be added to a basic system at ever increasing cost. Also, the software suppliers generally charge for software updates as well as for support and training, at regular intervals. Revenue to support the daily operations of the software vendors as well as the actual software development costs comes directly from the cabinetmakers through the aforementioned charges. Most cabinetmakers are aware of the existence of the aforementioned software products although a relatively small portion of the overall market has actually purchased such products. The likely reason for this is the initial and ongoing cost associated with the software products that offer a desirable level of features and capabilities. Most cabinetmakers are small companies and the costs associated with the software products represent a significant obstacle to these companies.

In addition to software products, certain companies have begun to offer CNC routers that can take the output from the software products and automatically produce the components necessary to build the cabinets. This dramatically increases productivity for the cabinet builder but such systems tend to be expensive. Although these systems can be cost justified for many cabinetmakers, the relatively large investment coupled with uncertainty of the economic result of using such a system results in most companies postponing a decision to adopt this technology.

In view of the foregoing, it is the principal object of the present invention to provide a method by which cabinetmakers can be provided with high-performance cabinet design software, updates and support free of charge, thus improving their productivity and profits.

Another object of the present invention is to allow cabinetmakers, using the aforementioned software, to select as part of the cabinet design and layout process, materials, components and supplies from a large number of industry suppliers.

A further object is to allow cabinetmakers, using the aforementioned software, to present to the final customer a realistic view of a complete kitchen and allow the customer to assist in selecting materials, components and supplies that will be used in building the kitchen.

A still further object is to allow the electronic ordering of the aforementioned materials, components and supplies from a single source with little or no clerical effort. Another object is to provide the cabinetmaker with information about the potential savings that could be realized for each job processed, if each job were to be processed on a CNC router as opposed to the traditional methods currently being used, making the justification for the purchase of such equipment clear, thus encouraging such a purchase.

A further object is to provide vendors to the cabinet industry a vehicle for promoting and marketing their products to the cabinetmaker's customer in a highly effective selling market.

Further objects and advantages of the present invention will become more apparent from the following detailed descriptions and accompanying drawing.

SUMMARY OF THE INVENTION

The present invention serves to overcome the aforementioned deficiencies of the prior art by providing a useful and valuable software system to cabinetmakers, free of charge. Such software system provides a means for selecting and purchasing material, components and supplies from a variety of vendors through a single e-business source. Furthermore, the cabinetmaker's customer may be included in the selection process, and the selected components may be presented in a three dimensional view of the final kitchen.

It further is contemplated that presenting the final cabinet layout in graphic detail before the manufacturing process begins will aid in selling the proposed kitchen and will further result in greater customer satisfaction.

Additionally, the present invention provides for the display of products from various vendors to a large number of both cabinetmakers and end customers, thus eliminating the need for vendors to set up accounts and deal with large numbers of cabinetmakers, requiring them to deal with a single e-business entity. In many cases, the vendor's products will be selected by the cabinetmaker's customer, virtually assuring that the vendor will receive the order. Industry suppliers, such as appliance manufacturers, can have their products incorporated into the kitchen layout with the cabinetmaker and customer working together. These selections by product and model number are then specified on the sales proposal, even though neither the cabinetmaker or the e-business will supply the product to the customer. For a small fee, the industry supplier has their product offered to customers who are actively considering a purchase. The e-business thus creates income from the vendor products sold to the cabinetmakers through the software, as well as from advertising fees from industry suppliers.

Moreover, it is probable that the sales of CNC router systems would be enhanced since the CNC program output from the software will only operate machines built by the e-business; therefore continued use of the software will encourage cabinetmakers to purchase such CNC routers.

Figure 1:
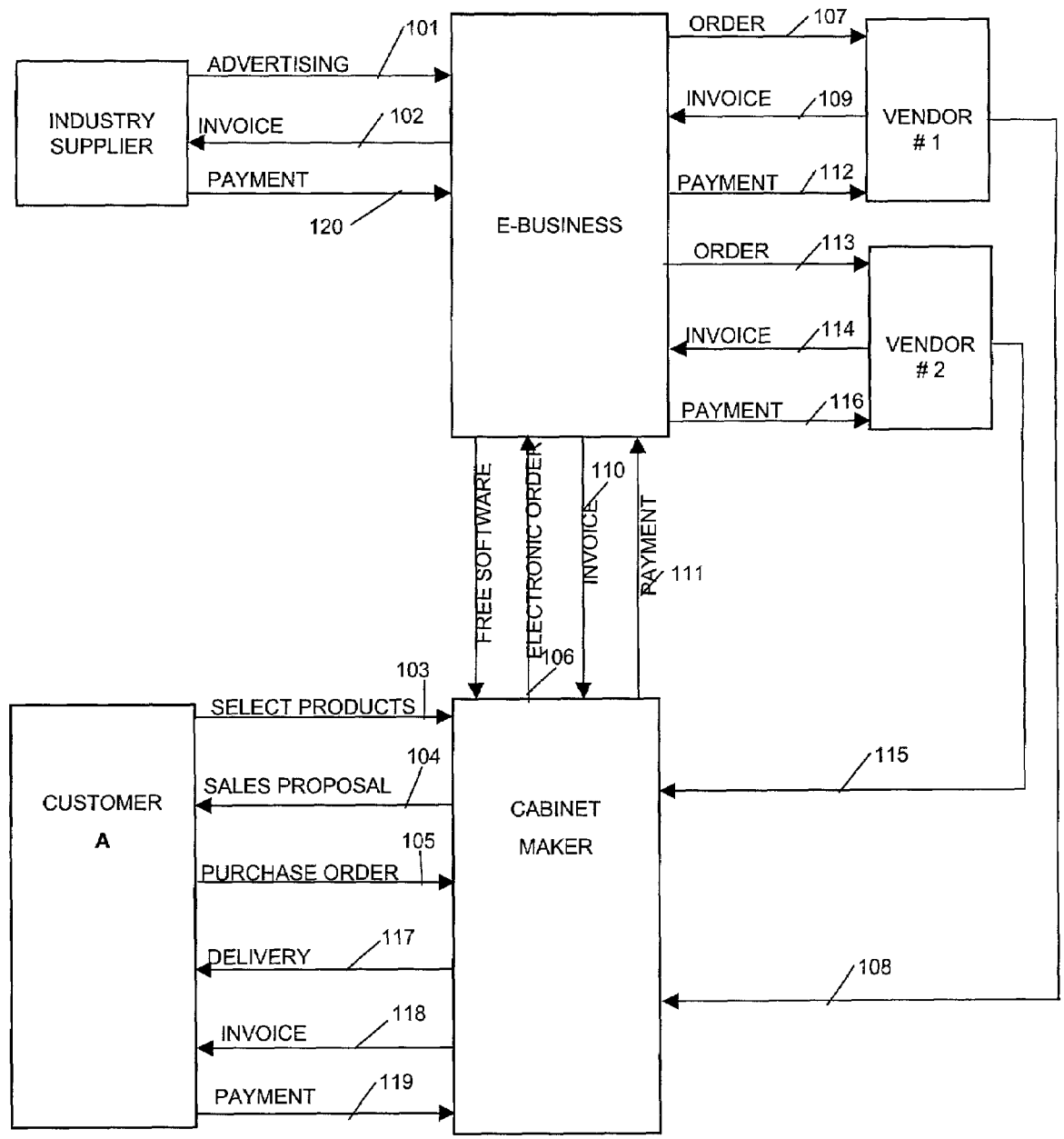
FIG. 1 is a block diagram illustrating the flow of the various transactions involved in the method of the present invention.

DESCRIPTION OF THE PREFERRED
EMBODIMENTS OF THE INVENTION

The e-business incorporates into a software product, the product offering of a number of vendors. The e-business has made arrangements in advance to receive orders for such products, and can purchase such products at a discount to the price that the cabinetmaker would normally pay for the product. The e-business also incorporates advertising information about certain products from industry suppliers where no arrangement has been made to receive orders. In this case, the e-business invoices the industry supplier and the industry supplier pays a fee to the e-business for each copy of the software delivered to a cabinetmaker.

The software necessary to carry out the various transactions is provided free of charge or at a very low cost to a number of cabinetmakers. The software provides for a realistic view of the proposed kitchen, which is shown, with the various components that have been selected. In addition to viewing on a computer screen, the kitchen can be viewed using a head-mounted display.

The head mounted display consists of a display screen viewable by the user, along with position feedback sensors that inform the computer the direction in which the person wearing the display is looking. As the person looks in different directions, the scene displayed is changed to show the view of the kitchen from each new direction. In this manner, it appears to the user that they are inside the proposed kitchen and they get a realistic view of the appearance of the kitchen with the selections made. While viewing in this manner, selections can be changed or modified to include any of the options available from the vendors that are participating in the program.

There is provided in FIG. 1 of the drawing, a block diagram illustrating the parties involved and exemplifying the transactions involved between such parties by way of flow lines. Each flow line is both labeled and numbered for reference purposes. For the purpose of simplicity, only two vendors and one each of an industry supplier, a cabinetmaker, and a customer are represented. However, it is to be understood that in addition to the e-business or distributor itself, a plurality of vendors, industry suppliers, cabinetmakers and customers of cabinetmakers, comprise the actual network of involved parties.

Referring to FIG. 1, using the software, the cabinetmaker works with customer A to design and lay out the kitchen, choosing materials, components and supplies from those offered in the catalog as represented by flow line 103. The software is used to create a sales proposal and quotation which are sent by the cabinetmaker to the customer as represented by flow line 104. Customer A accepts the sales proposal and orders the cabinets from the cabinetmaker as represented by flow line 105. Using the software, the cabinetmaker orders the materials, components and supplies required for the job from the e-business or distributor as represented by flow line 106. When the E-business receives the order from the cabinetmaker, the order may contain orders for products from several vendors. The E-business separates the order by vendor and transmits an order to each of the vendors as represented by flow lines 107 and 113. Each vendor ships the ordered products directly to the cabinetmaker as represented by flow lines 108 and 115, and then each vendor invoices the e-business as represented by flow lines 109 and 114. The cabinetmaker produces the product and delivers it to customer A as represented by flow line 117. Customer A is then invoiced as represented by flow line 118 and payment is sent to the cabinetmaker as represented by flow line 119.

The e-business combines the invoices from all the vendors supplying product to the cabinetmaker for the current job, marks the price up by an appropriate amount and transmits an invoice to the cabinetmaker as represented by flow line 110. The cabinetmaker then pays the invoice amount as represented by flow line 111. The e-business pays the vendors as represented by flow lines 112 and 116, generating a profit on the transaction.

The e-business has made arrangements in advance to incorporate information from various industry suppliers regarding certain products as represented by flow line 101. Such information may be instrumental in influencing the end-customer's decision to purchase the industry supplier's product, therefore making the information beneficial in terms of advertising value. The e-business thus invoices the industry supplier for each copy of software delivered to a cabinetmaker as represented by flow line 102. The industry supplier in turn sends a payment to the e-business as represented by flow line 120.

The cabinetmakers software is also used to either create shop drawings and manufacturing information for traditional manufacturing or, to produce the CNC code required to operate a CNC router to produce the required components. If traditional shop drawings are produced, the software also informs the cabinetmaker of the material savings as well as the time that would be required for the job if a CNC router were used instead of traditional methods. This feature offers a direct comparison on a job-by-job basis, which should help justify the investment in a CNC router for the cabinetmaker. Using the software, the design and ordering process requires very little time, resulting in significant savings for the cabinetmaker. The e-business may develop enhancements or improvements to the software and provide this updated software to the cabinetmakers on a regular schedule. Each time updated software is shipped, the industry suppliers in the new software can be charged an advertising fee, thus generating additional income for the e-business.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of manufacturing a composite product, comprising:

transmitting from a first party to a remote second party having access to a computer and a CNC machine, software useable upon inputting into said computer to design said composite product, generate a bill of materials for said composite product in accordance with said design and generate a program of instructions for the operation of said CNC machine to machine certain components of said composite product;

inputting said software into said computer by said second party;

operating said computer utilizing said software by said second party to generate a selected design of said composite product, a bill of materials for said designed composite product and a program for instructing said CNC machine to machine certain components of said designed composite product;

inputting said instructional program into said CNC machine;

operating said CNC machine in accordance with said instructional program to machine said certain components of said designed composite product;

acquiring other of said components of said designed composite product from a selected source; and assembling said machined and acquired components to form said designed composite product.

2. The method according to claim 1, wherein said selected source comprises said first party.

3. The method according to claim 2, wherein said software transmitted by said first party to said second party includes means for ordering said other components of said designed composite product, online.

4. The method according to claim 3, wherein said software transmitted by said first party to said second party includes advertisements of said other components of said designed composite product.

* * * * *